② United States Patent [19] | [11] 3,789,390
Burkness et al. | [45] Jan. 29, 1974

[54] SERIAL CODE TRANSLATOR

[75] Inventors: Donald C. Burkness, Silver Spring; William W. Warlick, Jr., Annapolis, both of Md.

[73] Assignee: The United States of America as represented by the Secretary of the Army

[22] Filed: Oct. 7, 1971

[21] Appl. No.: 187,246

[52] U.S. Cl. .......... 340/347 DD, 235/155
[51] Int. Cl. .......... H04l 3/00
[58] Field of Search .......... 235/155, 154; 340/347 DD

[56] References Cited

UNITED STATES PATENTS 3,564,225 2/1971 Watson, Jr. .......... 235/155
3,624,374 11/1971 Steiner .......... 340/347 DD
3,064,889 11/1962 Hupp .......... 235/155

*Primary Examiner*—Thomas A. Robinson
*Attorney*—John R. Utermohle et al.

[57] ABSTRACT

A serial scheme of translation between binary numbers and constant-ratio codes utilizing two storage devices and a train of clock pulses. As one storage device containing the number to be translated is counted down to a reference value, the other storage device is simultaneously counted up from a reference value to the equivalent number. If the number to be translated is a binary number, the equivalent number will be in constant ratio code, and vice-versa.

17 Claims, 7 Drawing Figures

CODE TRANSPOSER

MOTION OF TRANSPOSER LONG CYCLE
BINARY TO CONSTANT RATIO TRANSLATION

MOTION OF TRANSPOSER SHORT CYCLE
BINARY TO CONSTANT RATIO TRANSLATION

MOTION OF TRANSPOSER LONG CYCLE
CONSTANT RATIO TO BINARY TRANSLATION

MOTION OF TRANSPOSER SHORT CYCLE
CONSTANT RATIO TO BINARY TRANSLATION

SERIAL CODE TRANSLATOR

BACKGROUND OF THE INVENTION

This invention relates to the field of electrical translation between two number systems. The basic problem presented by the prior art is that translation schemes between different character systems have heretofore utilized a parallel translation scheme rather than the sequential, serial scheme of the present invention. In a typical parallel scheme of conversion, the number to be translated is represented on a number of parallel input lines, rather than being represented serially on a single input line. The input usually consists of a number of gates, the combination of input signals representing the character to be translated enabling the correct gates in the apparatus. The output of these gates is then fed simultaneously to a plurality of gates equal to the length of the character, thus enabling the desired pattern. The same type of system may be utilized in translating back into the original character form. This system requires a large number of gates, and depending upon the size of the alphabet used, the physical size of the translation apparatus and its cost become considerable.

The prior art shows several solutions to the basic problem previously discussed. There are several references which show a non-parallel translation scheme to accommodate the specific task of binary-to-Morse-code conversion. The techniques utilized in these references, however, are useful only in translating between binary and Morse, and cannot be adapted to other character systems. There are other prior art schemes which show non-parallel techniques for conversion between binary and other numbering systems, but none of these references have a capability of two-way translation between two character systems using the same equipment. Thus, the prior art still lacks a basic reference which teaches a scheme of non-parallel conversion between a variety of character systems, at the same time being capable of translation in both directions between the two character systems using the same equipment.

SUMMARY OF THE INVENTION

The present invention is a scheme for translating, in a serial fashion, between two number systems, in both directions. More specifically, this invention is a serial translation scheme for converting between binary-and-constant-ratio coded numbers and vice-versa. The present invention solves the problems of the prior art, in that it is a serial, sequential scheme of translating between two numbering systems, the large number of gates of the prior art being eliminated and being replaced by a storage device and a train of clock pulses, which accomplish the translation. The basic techniques disclosed in this invention are applicable for conversion between a wide variety of numbering systems. The present invention accomplishes a serial translation between a binary number and a constant-ratio coded number. The present invention is capable of translating in either direction with the same equipment. This system utilizes several storage devices, a number of detectors, and a train of controlled clock pulses. The number or character to be translated is placed in a first register or other storage device. The train of clock pulses then pulses the storage device sequentially downward in value, bit-by-bit, until a zero, or reference value, is reached. Simultaneously, the same train of clock pulses is pulsing a second storage device, which was initially set at a zero or a reference value, upward in value. Thus, as the one storage device is pulsed sequentially downward to a reference value, the other device is pulsed upward in value. When translation is completed, the second storage device will contain the equivalent translated number of the number originally placed in the first storage device. Special techniques of feedback, to be fully explained later, are utilized, along with common principles of Boolean algebra, in conjunction with one of the storage devices to achieve accurate translation in both directions between binary and constant-ratio-coded numbers.

One object of this invention is to provide a serial scheme of translation between one numbering system and another.

Another object of the invention is to provide a serial scheme of translation between a binary number and a constant-ratio-coded number.

A further object of this invention is to provide a serial scheme of translation between binary and constant-ratio-coded numbers where translation is accomplished in both directions.

PREFERRED EMBODIMENT OF THE INVENTION

Figure 1:
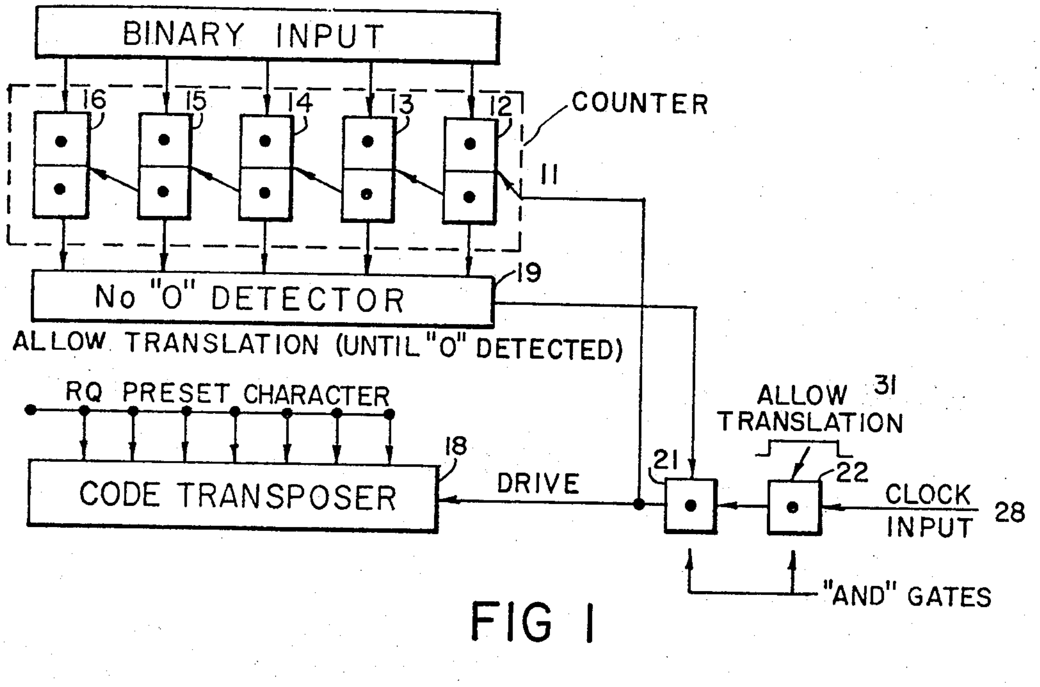
FIG. 1 is a block diagram of the binary-to-constant ratio code translator showing binary-to-constant ratio code translation.
Figure 2:
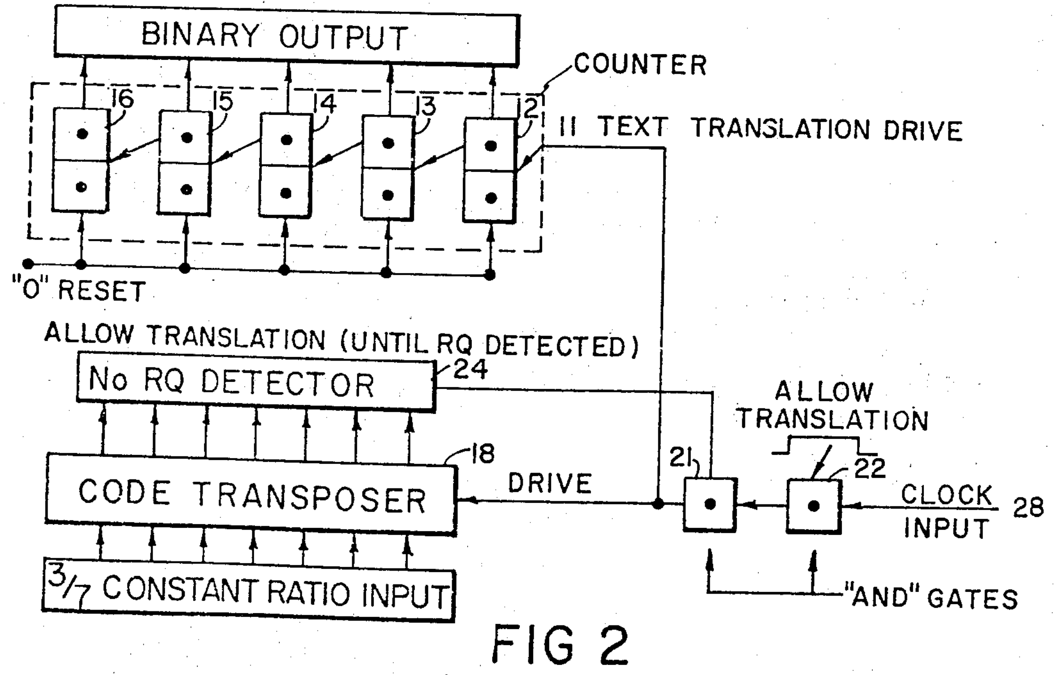
FIG. 2 is a block diagram of the binary-to-constant ratio code translator showing constant-ratio code to binary translation.

The present invention uses a number of well known components and techniques in a novel manner to achieve the desired results of serial translation between a binary number and a constant-ratio coded number. Referring to FIG. 1, the system is basically composed of two storage devices; one being a standard counter 11 composed of a series of serially connected standard binary circuits 12–16. In this preferred embodiment, the counter 11 displays the binary number, regardless of whether the translation is from binary-to-constant-ratio code or the reverse. Referring to FIG. 1, the preferred embodiment has five binary places, in this case five binary circuits, within the counter. Again referring to FIG. 1, the other storage device is labeled the code transposer 18, consisting of a shift register for storing values. The number of places of the shift register corresponds to the length of the desired constant-ratio coded number. In the preferred embodiment, the shift register contains seven places because the number system is three-sevenths constant-ratio code, meaning that every character in the three-sevenths constant-ratio code alphabet has seven places, three places of a plus or one value and four places of a minus or zero value. When the operation of the translator is to translate a binary number into a constant-ratio coded number, a standard no-zero detector 19 operates in conjunction with the binary counter. This detector monitors the condition of each place of the binary counter, and enables "and" gate 21 as long as any place within the binary storage device contains a non-zero value. Referring to FIG. 2, when translation is from the constant-ratio code to its equivalent binary number, another detector circuit known as the no-RQ detector 24 is working in conjunction with the code transposer storage device. This detector monitors each place in the storage device and continuously enables "and" gate 21 until a certain character, (one character having seven places) known as the RQ setting is detected, at which time the enabling signal to "and" gate 21 will cease. As long as the RQ value is not detected, "and" gate 21 will be enabled by the RQ detector.

Referring to both FIG. 1 and 2, the other basic components in the translation system are a standard source of sequential clock pulses 28, and the "and" gate 22. When the apparatus is ready to translate, i.e., when the number to be translated is in one of the storage devices and the other is cleared, an "allow translation" pulse, long enough to accommodate a complete cycle enables this first "and" gate 22 to pass the clock pulses. This "allow translation" pulse can be provided externally or from another part of the apparatus.

Referring to FIG. 1, the preferred embodiment is in a configuration illustrating binary-to-constant-ratio code. The binary number is first loaded into the binary counter 11. The "allow translation" pulse 31 enables "and" gate 22 to pass the series of clock pulses to the second "and" gate. The second "and" gate 21 is continuously enabled by the no-zero detector until a zero is detected in all of the places of the storage device 11. After the pulse train passes the second "and" gate, it is directly connected to both storage devices. The binary counter 11 and the code transposer 18 are pulsed simultaneously by the clock input pulse train. The original binary number placed in the counter is pulsed down to zero by the clock pulse train. The no-zero detector will subsequently cease enabling the second "and" gate. Thus, when the binary value reaches zero in the counter, the drive pulses cease, both to the counter and to the code transposer. The value then in the code transposer is the equivalent constant-ratio coded character to the original binary number placed in the binary counter.

Referring to FIG. 2, the preferred embodiment is in a configuration illustrating constant-ratio code to binary translation. The constant-ratio code to be translated is first loaded into the code transposer 18, after it has been set to its initial RQ setting. The operation of the first "and" gate and the "allow translation pulse" is identical to that explained above. The pulse train then passes to the second "and" gate which is enabled by the no-RQ detector. This "and" gate is enabled as long as the no-RQ detector does not detect a particular setting of the code transposer known as the RQ setting. As previously explained, the code transposer is a shift register, connected in an end-around fashion, with other feedback variations, so that there are three plus (one) values and four minus (zero) values in the shift register at all times. A valid character is one that contains three plus (one) values and four minus (zero) values. An initial setting of the code transposer having three plus and four minus values is an arbitrary one and is known as the RQ setting. Thus, as long as the detector does not detect this RQ character value in the code transposer, "and" gate 21 is continuously enabled and passes the train of clock drive pulses. The clock drive pulses are fed simultaneously to the code transposer and to the binary output storage device. As the clock drive then pulses the register from the original constant-ratio coded number downward toward the RQ setting, (which thus functions as a zero in the register) it simultaneously pulses the binary counter upwards in value from a zero value. When the RQ setting in the code transposer is detected, the "and" gate 21 is disabled and the train of clock pulses is prevented from reaching both the code transposer and the binary counter. That value in the binary counter when the code transposer reaches the RQ setting is the binary equivalent of the original three-sevenths constant-ratio coded character originally placed into the code transposer.

Figure 3A:
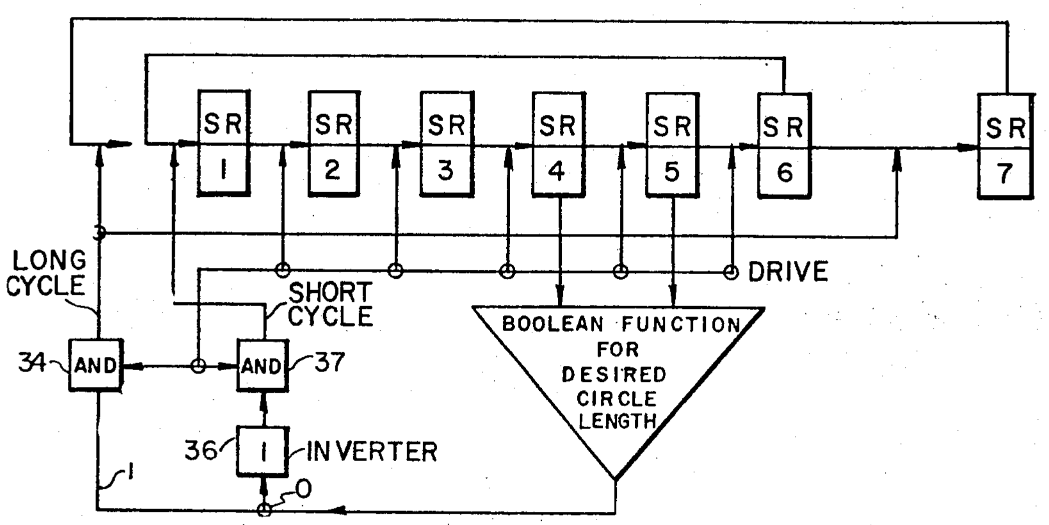
FIG. 3A is a diagram of the code transposer shown in block diagram form in FIGS. 1 and 2.
Figure 3B:
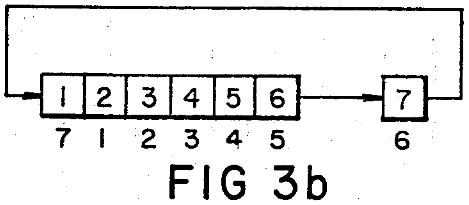
FIG. 3B shows the sequential movement of the transposer values in the long cycle operation in binary-to-constant ratio code translation.
Figure 3C:
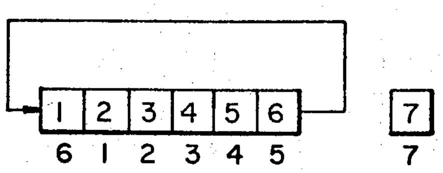
FIG. 3C shows the sequential movement of the transposer values in the short cycle operation in binary-to-constant ratio code translation.

The code transposer circuitry is responsible for achieving the desired number of distinct characters in a particular constant-ratio code, each character having the required features of the three-sevenths constant-ratio code. Referring to FIG. 3A, which shows the basic circuitry of the code transposer, it is evident that two types of end-around shifts are employed in this code transposer. One end-around shift is known as the short cycle, in which the value in shift register component number 6 is shifted to component number 1, number 1 shifting to 2, number 2 to 3, number 3 to 4, 4 to 5, and number 5 to 6, when the shift register is sequentially pulsed. The value in shift register component 7 remains unchanged. In the other type of operation, known as the long cycle, the shift register operates similar to a standard end-around shift register. When the shift register is pulsed, the value in shift register component 1 goes into 2, 2 into 3, 3 into 4, 4 into 5, 5 into 6, 6 into 7, and the value of 7 returns in end-around fashion to shift register component number 1. The operation of the shift register changes continually between the two modes. This type of operation will result in sufficient individual characters, each having the characteristics of three plus (one) places and four minus (zero) places. The determination of whether an individual shift will be in the long cycle mode or the short cycle mode is achieved by the use of a Boolean algebraic function operating on certain of the values in the shift register.

It is first necessary to determine the Boolean function which will give sufficient discrete characters of the type desired. A typical Boolean function might be to add the values in shift register component 4 and shift register component 5. (Shown in the drawing.) This is accomplished by a standard "add" circuit. A typical rule might be the following: If the sum of the two values in those components is equal to one, the next shift of the register is in the long cycle mode of operation; if the sum is equal to zero, the next shift is in the short cycle mode of operation. It is emphasized that one must experiment to find the proper Boolean function that will give the desired number of characters of the desired constant-ratio code. Referring again to FIG. 3A, in a hypothetical example, if the sum of components 4 and 5 is equal to 1, the long cycle would be enabled through the "and" gate 34. If the sum is zero, the short cycle line is enabled through inverter 36 and "and" gate 37. This operation insures that each shift of the shift register will result in a discrete three-sevenths constant coded character. Using this hypothetical Boolean function, 35 discrete characters are possible in three-sevenths code. Other constant coded numbering systems may be achieved by varying the number and types of feedback of the individual shift register components.

Referring again to FIG. 1, the sequential operation of the invention may easily be described. For binary to three-sevenths constant-ratio code translation, the five-bit binary character is placed in the five stages of the binary counter 11. The three-sevenths constant-ratio coded character that is in the code transposer 18 at this time is the arbitrary, preset, character known as the RQ character. If the no-zero detector 19 does not detect a zero in the binary counter, translation is allowed, and the train of clock pulses simultaneously pulse both the binary counter and the code transposer, until a zero is detected in each stage of the counter by the no-zero detector. When the zero is detected, translation is concluded, and the character which is presently in the shift register of the code transposer is the equivalent three-sevenths constant-ratio coded character of the original binary number placed in the binary counter at the beginning of the translation.

Figure 3D:
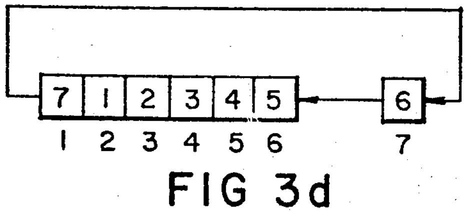
FIG. 3D shows the sequential movement of the transposer values in the long cycle operation in constant ratio to binary translation.
Figure 3E:
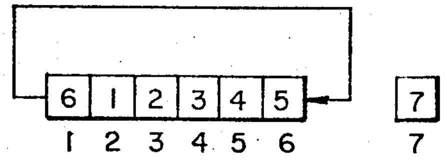
FIG. 3E shows the sequential movement of the transposer values in the short cycle operation in the constant ratio to binary translation.

FIG. 2 shows the operation of the invention in translating from a three-sevenths constant-ratio coded character to its equivalent binary number. Initially, the value in the code transposer shift register is the arbitrary setting known as the RQ character. Thus, the RQ setting serves functionally as a reference, or zero, value for the code transposer shift register. The value in the binary counter initially is zero. The code transposer shift register is then loaded with the three-sevenths constant-ratio coded character to be translated. If the RQ setting is not detected by the no-RQ detector circuit, (indicating that a valid character is present in the register) translation is allowed, and the clock drive train pulses the code transposer and the binary counter simultaneously. The clock drive train continues to pulse the code transposer backwards as illustrated in FIGS. 3D and 3E until the no-RQ detector detects the RQ character in the shift register. When the detector does detect the RQ value, translation ceases and the clock drive train is no longer passed. The value which is present in the binary counter when translation ceases (when the RQ character setting is detected) is the equivalent binary number of the original three-sevenths constant-ratio coded number originally placed in the code transposer shift register.

The above description is of a preferred embodiment of the invention and numerous modifications could be made thereto without departing from the spirit and scope of the invention which is limited only as defined in the appended claims. For example, modifications may be made in the feedback of the code transposer shift register, and the Boolean function, thereby enabling translation between many different numbering systems.

What is claimed is:

1. An apparatus for the reversible translation of binary and constant ratio codes comprising:

a first storage device, which initially contains the character to be translated, and which at the completion of translation contains a first reference value;

a detecting means connected to said first storage device to detect the first reference value;

a second storage device, which initially contains a second reference value, and which at the completion of translation contains the translated value of the character initially loaded into the first storage device;

means connected to said first and second storage devices to drive said first and second storage devices to accomplish said translation, and means connected between said storage devices and said detector whereby said translation may be accomplished in reverse.

2. An apparatus according to claim 1 wherein at least one of said storage devices is a binary counter.

3. An apparatus according to claim 2 wherein at least one of said storage devices includes a shift register.

4. An apparatus according to claim 3 wherein the means to drive said first and second storage devices includes means to drive said first and second storage devices simultaneously.

5. An apparatus according to claim 4 wherein means to drive said first and second storage devices includes means to provide a series of successive drive pulses.

6. An apparatus according to claim 5 wherein the means to drive said first and second storage devices includes a means to pass said drive pulses.

7. An apparatus according to claim 6 wherein said means to pass said drive pulses includes a first "and" gate, said "and" gate being enabled when translation is desired.

8. An apparatus according to claim 7 wherein the means to pass said drive pulses includes a second "and" gate connected to said first "and" gate to pass said drive pulses, said second "and" gate being enabled when translation is desired.

9. An apparatus according to claim 8 wherein said detecting means is a first gating means connected to said second "and" gate, said first gating means enabling said second "and" gate as long as the first reference value is not detected in the first storage device.

10. An apparatus according to claim 9 wherein the last stage of said shift register is connected to the first stage of said shift register.

11. An apparatus according to claim 10 wherein another stage in addition to the last stage of the shift register is connected to the first stage of the shift register.

12. An apparatus according to claim 11 wherein the shift register includes means to change the operation of the shift register between a short cycle and a long cycle of operation.

13. An apparatus according to claim 12 wherein said means to change the operation of the shift register includes an adder circuit connected to two stages of the shift register, the output of said adder connected to a second gating means for passing said output to said shift register.

14. An apparatus according to claim 13 wherein said adder circuit is connected to two stages of the shift register, said adder having an output of one if the value of one stage is one and the other zero, and an output of zero if both stages are either ones or zeros, said output connected to said second gating means for passing the output of the adder to the shift register.

15. An apparatus according to claim 14 wherein said second gating means for passing the output of the adder to the shift register includes a third "and" gate, said third "and" gate connected to the drive pulse train means, said adder circuit, and the input of every stage of said shift register, said third "and" gate passing said drive pulses to said stages of the shift register when the output of said adder is a one.

16. An apparatus according to claim 15 wherein said second gating means for passing the output of the adder to the shift register includes an inverter connected to said adder circuit, and a fourth "and" gate, said fourth "and" gate connected to said inverter, to said drive pulse train means, and to the input of some number of stages of the shift register less than the total number, said fourth "and" gate passing said drive pulses to said stages of the shift register when the output of said adder is zero.

17. An apparatus according to claim 16 wherein said shift register has seven stages, the seventh stage and the sixth stage being connected to the first stage, said fourth "and" gate connected to the input of the first six stages, and said third "and" gate connected to the inputs of all seven stages of said shift register.

* * * * *